United States Patent [19]

Mraz

[11] Patent Number: 4,986,413

[45] Date of Patent: Jan. 22, 1991

[54] CONVEYOR BELT INVERSION DEVICE

[75] Inventor: Dennis Mraz, Saskatoon, Canada

[73] Assignee: DM Enterprises, Inc., Saskatoon, Canada

[21] Appl. No.: 436,202

[22] Filed: Nov. 14, 1989

[51] Int. Cl.[5] .............................................. B65G 15/60
[52] U.S. Cl. ...................................................... 198/839
[58] Field of Search ............................................ 198/839

[56] References Cited

U.S. PATENT DOCUMENTS

| | | | |
|---|---|---|---|
| 3,251,455 | 5/1966 | Lorvi | 198/839 |
| 4,609,099 | 9/1986 | Pentith | 198/839 |
| 4,842,130 | 6/1989 | Mraz | 198/839 |

*Primary Examiner*—Joseph E. Valenza
*Attorney, Agent, or Firm*—Staas & Halsey

[57] ABSTRACT

An inversion apparatus uses a first pair of bend rollers to twist a conveyor belt 90°, and a second pair of bend rollers to twist the conveyor belt an additional 90°. The two bend rollers of each pair are rotatably mounted at rotational axes which are perpendicular to each other. Preferably, stabilizer rollers are provided between the bend rollers of each pair, and cylindrical rollers are provided to feed the conveyor belt to and from the bend rollers. The stabilizer rollers and bend rollers are preferably curved so as to equalize the tension across the width of the belt.

10 Claims, 2 Drawing Sheets

CONVEYOR BELT INVERSION DEVICE

BACKGROUND OF THE INVENTION

1. Field of the Invention:

The present invention relates generally to conveyors and conveying devices and more specifically, to a device which uses an arrangement of rollers to invert a conveyor belt running in an endless belt conveying system.

2. Description of the Related Art:

In an endless belt conveying system, a conveyor belt conveys material in one direction between points. At one point, articles or materials conveyed on the upper surface of the conveyor belt are discharged, and at the other point articles or material are placed on the conveyor for transport. After the material is discharged at the one point, the belt turns 180° at for example, an end roller, so that the upper surface is now facing downwardly until it travels to the other point, where another end roller turns the belt 180° so that the carrying surface is once again on the upper side. In some areas of use, such as in the mining arts, the distance between the two points may be measured in the thousands of feet. Thus, for the entire length of the distance between the two points, the material-carrying surface is upside down on the return run of the belting.

When the carrying side of the endless conveyor belt is in contact with a material which has a sticky nature, not all of the material will be discharged at the discharge point and thus, as the belt is inverted, a residue of material is carried upside down as the belt travels back to the pick-up point. This contamination of the conveyor belt surface can present an environmental problem, particularly where the conveyor system will cross bodies of water or other environmentally sensitive areas. The material adhering to the surface of this downward-facing return run of the endless belt conveyor falls off the belt over the length of the conveying system. Such material in time builds up and requires removal with resultant cost implications, and may in any case be undesirable if it is being dropped onto a surface which is required to be kept clean at all times.

Belt turnover devices have been used in the past to achieve an inversion of the return run of the conveyor belt so as to place the material-carrying surface on the upper side on the return run. However, in the known devices the turnover is achieved over an extended length. This is undesirable due to the fact that the material dropped from the conveyor belt occurs over most of the length of the inversion device, thereby failing to solve the problem of material deposits. These devices suffer an additional disadvantage in that they cannot operate or be installed in a limited space. Thus, installation and operation becomes impractical.

Another problem with the known devices which invert a belt over the extended length of the return run is that the conveyor belt often drop off its guide rollers due to gravity if tension is not appropriately controlled in the belt. This may result in the conveyor belt leaving its correct path through the inversion device and becoming fouled on parts of the belt inversion device or on other equipment or structure.

Another problem associated with known types of belt inversion devices is that the distribution of tension in the conveyor belt as it is rotated through 180° is altered so that there exists a higher tension in the outer (edge) portion of the conveyor belt cross-section and a lower tension in the central portion of the conveyor belt cross-section. Higher tension in the outer portion of the conveyor belt may lead to failure of the conveyor belt and of the conveyor belt splices.

SUMMARY OF THE INVENTION

An object of the present invention is to provide a conveyor belt inversion apparatus wherein the conveyor belt remains in a desired position at all times, including times when tension is reduced in the endless conveyor belt.

Another object of the present invention is to provide a conveyor belt inversion apparatus which compensates for varying tension loads on the belt and thereby prevents failure of the conveyor belt and of the conveyor belt splices.

Another object of the present invention is to provide a conveyor belt inversion device which prevents material adhering to the material-carrying surface of the belt from dropping off on the return run of the belt.

Another object of the present invention is to provide a conveyor belt inversion apparatus which does not excessively wear the conveyor belt.

Another object of the present invention is to provide a conveyor belt apparatus which prevents environmental contamination due to the release of material from the upside down conveying surface on the return run of a conveyor belt.

These and other objects of the present invention are met by providing an inversion apparatus for a moving conveyer belt which includes first means for twisting the belt 90° relative to a longitudinal axis of the belt, means for turning the twisted belt 180° about an axis substantially parallel to the longitudinal axis of the belt, and second means for twisting the twisted turned belt an additional 90°.

Preferably, the first and second twisting means comprise a pair of bend rollers, each roller of a pair being disposed 90° relative to the other roller of the same pair, so as to twist the belt 90° about the longitudinal axis of the belt.

Preferably, stabilizer pulleys are provided between the two bend rollers of each pair of bend rollers so as to facilitate the 90° twist. Also, cylindrical pulleys are preferably provided for directing the conveyor belt to and from each pair of bend rollers.

These and other features and advantages of the conveyor belt inversion apparatus of the present invention will become more apparent with reference to the following detailed description and drawings.

DETAILED DESCRIPTION OF THE PREFERRED EMBODIMENTS

Figure 1:
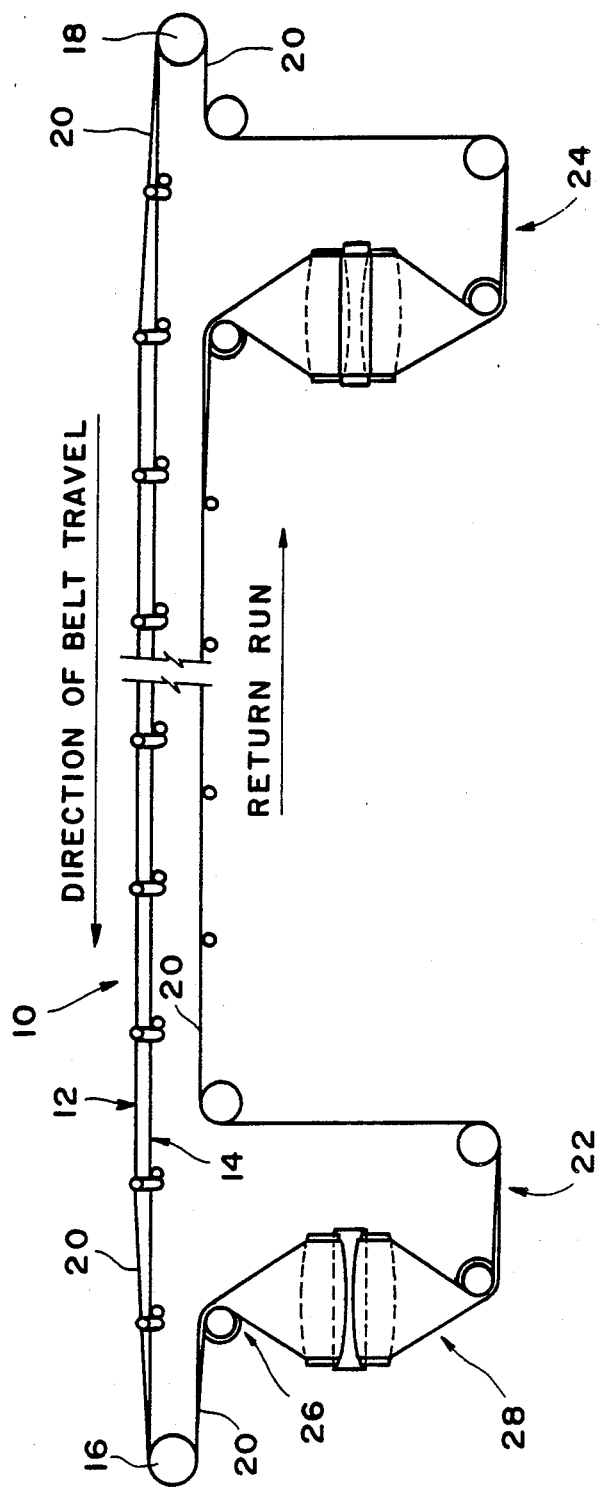
FIG. 1 is a schematic view of a first preferred embodiment of the present invention, which is manifest in a conveyor system which includes two inversion apparatuses, one disposed at each opposite end of the conveyor.

Referring now to FIG. 1, a conveyor system is generally referred to by the numeral 10. A conveyor belt 12 is moved in a direction of belt travel (from right to left FIG. 1) on a support structure 14. The belt is "endless" in that it loops around two terminal points 16 and 18. Terminal point 18 may be a point of material pickup for loading material onto the conveyor belt, and terminal 16 may be a point of discharger where the conveyed material is conveyed from the conveyor belt. At each of the terminal points 16 and 18 the belt is inverted, so that the material carrying surface 20 which is facing upwardly as the belt moves from right to left, faces downwardly on the return run from left to right after rounding the terminal points 16 and 18, which are represented schematically as belt rollers.

Without additional inverting means, the material carrying surface 20 facing downwardly on the return run would cause the deposition of non-discharged material in unwanted areas. Thus, the system according to the present invention entails providing a first inversion apparatus 22 for inverting the belt for the return run so that the material carrying surface 20 is facing upwardly, and a second inversion apparatus 24 for inverting the belt once again at the end of the return run so that after passing the terminal point 18 the material carrying surface is once again facing upwardly. The belt, after passing through inversion apparatus 24, is preferably inverted in a direction opposite to that in inversion apparatus 22, so that the belt is twisted through 0° overall, instead of 360°.

Figure 2:
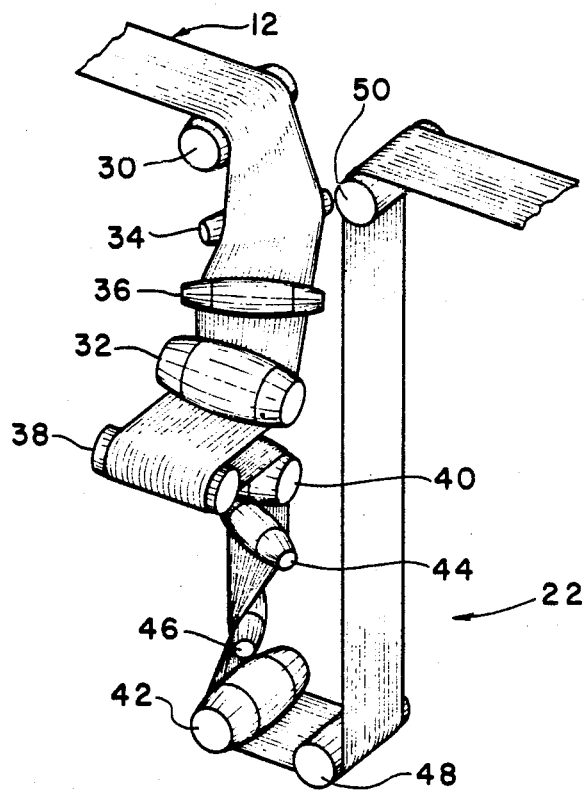
FIG. 2 is a schematic, perspective view of an inversion apparatus used in the system of FIG. 1.
Figure 3:
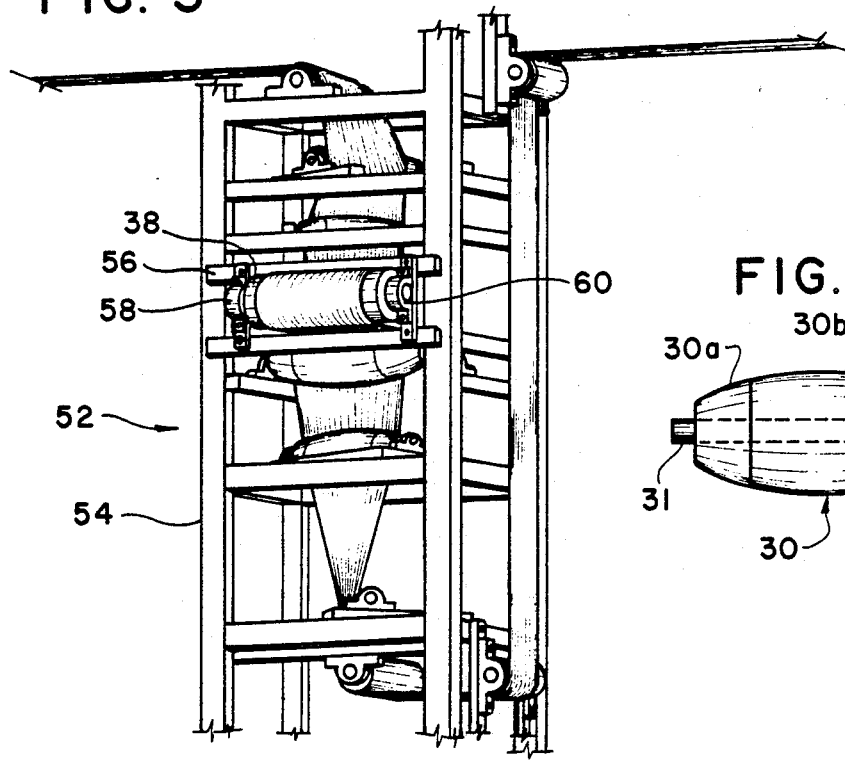
FIG. 3 is a side elevational view showing a basic framework for supporting the various rollers and pulleys in the inversion apparatus of FIG. 2.

Each inversion apparatus includes first means 26 for twisting the belt 90° about a longitudinal axis of the belt, and second means 28 for twisting the belt an additional 90° so that the material carrying surface, which was facing downwardly prior to entering the inversion apparatus 22, is now facing upwardly after passing through the inversion apparatus 22. Details of the inversion apparatus 22 are illustrated in FIGS. 2 and 3. It should be noted that in a typical application of the present invention, the belt width is about 42 inches and is made of three-ply rubber belting. The belt travels at a speed of about 600 feet per minute and the belt tension in the inversion apparatus is about 7,000 pounds. Now referring to FIG. 2, the various pulleys and rollers which collectively constitute an inversion apparatus according to the present invention are illustrated separate from their supporting structure and bearings so as to better illustrate the inventive features of the apparatus. It is sufficient to note at this point that the frame and bearings can be assembled on a site-specific basis. Thus, the exact structure of the frame and bearings which facilitate rotational movement of the rollers and pulleys are not considered unique per se, but are within the purview of the skilled practitioner to adapt to the particular situation.

As shown in FIG. 2, a first pair of bend rollers 30 and 32 are mounted on a frame (not shown in FIG. 2) for rotational movement. Bend roller 30 rotates about an axis which is substantially perpendicular to the longitudinal axis of the belt 12, while bend roller 32 rotates about an axis substantially perpendicular to the rotational axis of bend roller 30, and substantially parallel to the longitudinal axis of the belt 12. The right angled disposition of the two bend rollers relative to each other causes the belt to twist about 90° around the longitudinal axis of the belt 12.

Stabilizer rollers 34 and 36 may be provided between the two bend rollers 30 and 32 in order to stabilize the conveyor belt as it passes over the bend roller 30 and then under the bend roller 32. Although the stabilizer rollers are optional, they are preferred given that a moving belt tends to oscillate.

The bend rollers 30 and 32 and the stabilizer rollers 34 and 36 may have a curved outer surface on which the conveyor belt runs. The diameter of the bend roller and stabilizer rollers is thus greater at the center and tapers gradually towards the opposite ends thereby reducing the diameter towards the outer opposite ends. The purpose of the curved surface is to reduce tension in the outer portion of the conveyor belt cross-section which increases as a natural result of the rotation about the longitudinal axis of the conveyor belt, which is induced by the twisting action imparted by the two bend rollers 30 and 32.

Figure 2A:
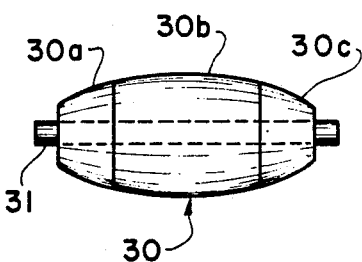
FIG. 2a is a side elevational view of a preferred bend roller used in the inversion apparatus of FIG. 2.

Referring to FIG. 2a, a preferred embodiment of one of the curved rollers, such as bend roller 30, is illustrated as having three segments 30a, 30b, and 30c, each of which rotates independently of the other on a common shaft 31 which may be journalled in appropriate bearings mounted on the frame. Thus, the three segments collectively define a curved outer surface which inherently equalizes tension along a twisted part of the belt. Moreover, because the opposite end portions can rotate independent of the medial portion, friction or wear between the roller and corresponding surface of the belt is mitigated.

A cylindrical roller 38 is provided after the second bend roller 32 of the first pair of bend rollers. The cylindrical roller 38 supports and guides the belt 12 as it proceeds to the second pair of bend rollers 40 and 42. The cylindrical roller 38 turns the belt 180° and thus inverts the surface of the belt prior to being further twisted 90° by the pair of bend rollers 40 and 42. The bend roller is mounted for rotational movement about a rotational axis which is parallel to the rotational axis of the bend roller 32, while the bend roller 42 is mounted for rotational movement about an axis perpendicular to the bend roller 40 and substantially parallel to the rotational axis of the bend roller 30. Stabilizer rollers 44 and 46 serve a function similar to that of the stabilizer rollers 34 and 36, and are disposed between the bend rollers 40 and 42. Additional cylindrical rollers 48 and 50 are provided to feed the belt 12 from the last bend roller 42 to the terminal point 18, which may be an end roller.

The frame which supports various rollers of FIG. 2 is indicated generally in FIG. 3 by the numeral 52, and is made of a series of interconnected vertical supports 54 and horizontal supports 56 which are interconnected to form a rigid structure. Bearings 58 and 60 are illustrated as typical mountings for a rotational shaft of the cylindrical roller 38. This type of mounting would apply equally to the other rollers, with the exception that the axes of rotation are oriented as illustrated in FIG. 2.

Adjustment means may be included in the mounting of individual bend rollers, stabilizer rollers, and cylindrical rollers, such that minor adjustments in the position of the rollers may be made when installed in the frame.

Numerous modifications and adaptations of the inversion apparatus will be apparent to those so skilled in the art and thus it is intended by the following claims to cover all such modifications and adaptations which fall within the true spirit and scope of the invention.

What we claim is:

1. An inversion apparatus for inverting a return run of a moving conveyor belt, comprising:
   a first bend roller carrying the return run of the belt and having a horizontal rotation axis oriented transversely to an upper run of the belt;
   a second bend roller having a horizontal rotation axis oriented parallel to the upper run of the belt, the first and second bend rollers twisting the return run of the belt 90° and bending the return run of the belt 90° away from the upper run of the belt;
   a third bend roller having a horizontal rotation axis oriented parallel to the upper run of the belt;
   a fourth bend roller having a horizontal rotation axis oriented transversely to the upper run of the belt, the third and fourth bend rollers twisting the return run of the belt and additional 90° to complete a 180° twisting belt, and bending the belt an additional 90° to parallel the upper run; and
   a frame supporting the first, second, third and fourth bend rollers in their respective positions.

2. An inversion apparatus according to claim 1, wherein each of the first, second, third and fourth bend rollers has a curbed outer surface, and a maximum diameter at a medial transverse plane and a symmetrically reducing diameter towards opposite ends of the roller.

3. An inversion apparatus according to claim 2, wherein each bend roller is segmented into a plurality of segments which are rotatably mounted on a shaft for rotational movement independent of each other.

4. An inversion apparatus according to claim 1, further comprising at least two stabilizer rollers, one disposed between the first and second bend rollers and one between the third and fourth bend rollers.

5. An inversion apparatus according to claim 4, wherein each stabilizer roller has a horizontal rotation axis which is angled relative to the respective bend rollers.

6. An inversion apparatus according to claim 5, comprising first and second stabilizer rollers disposed between the first and second bend rollers and third and fourth stabilizer rollers disposed between the third and fourth bend rollers.

7. An inversion apparatus according to claim 6, wherein each of the stabilizer rollers is segmented to include a plurality of independently rotatable segments mounted on a common shaft for rotational movement independent of each other.

8. An inversion apparatus according to claim 1, further comprising a cylindrical roller disposed between the second and third bend rollers.

9. An inversion apparatus according to claim 1, further comprising first and second cylindrical rollers, each having a horizontal rotational axis and being oriented transverse the upper run of the belt, the rotation axes of the fourth bend roller and the first cylindrical roller being disposed in a first substantially horizontal plane, and the rotational axes of the first bend roller and the second cylindrical roller being disposed in a second substantially horizontal plane.

10. A conveyor system for moving material between two points along an endless conveyor belt, the system comprising:
   a first inversion apparatus disposed near one of the two points on a return run side of the belt for inverting the belt; and
   a second inversion apparatus disposed near the opposite point on the return run side of the belt for inverting the belt, whereby a material carrying surface of the belt faces upwardly for a substantial length of the return run due to inversion of the belt imparted by the first inversion apparatus, wherein each inversion apparatus includes a first bend roller carrying the return run of the belt and having a horizontal rotation axis oriented transversely to an upper run of the belt, a second bend roller having a horizontal rotation axis oriented parallel to the upper run of the belt, the first and second bend rollers twisting the return run of the belt 90° and bending the return run of the belt 90° away from the upper run of the belt, a third bend roller having a horizontal rotation axis oriented parallel to the upper run of the belt, a fourth bend roller having a horizontal rotation axis oriented transversely to the upper run of the belt, the third and fourth bend rollers twisting the return run of the belt an additional 90° to complete a 180° twisting of the belt, and bending the belt and additional 90° to parallel the upper run, and a frame supporting the first, second, third and fourth bend rollers in their respective positions.

* * * * *